Figure 1:
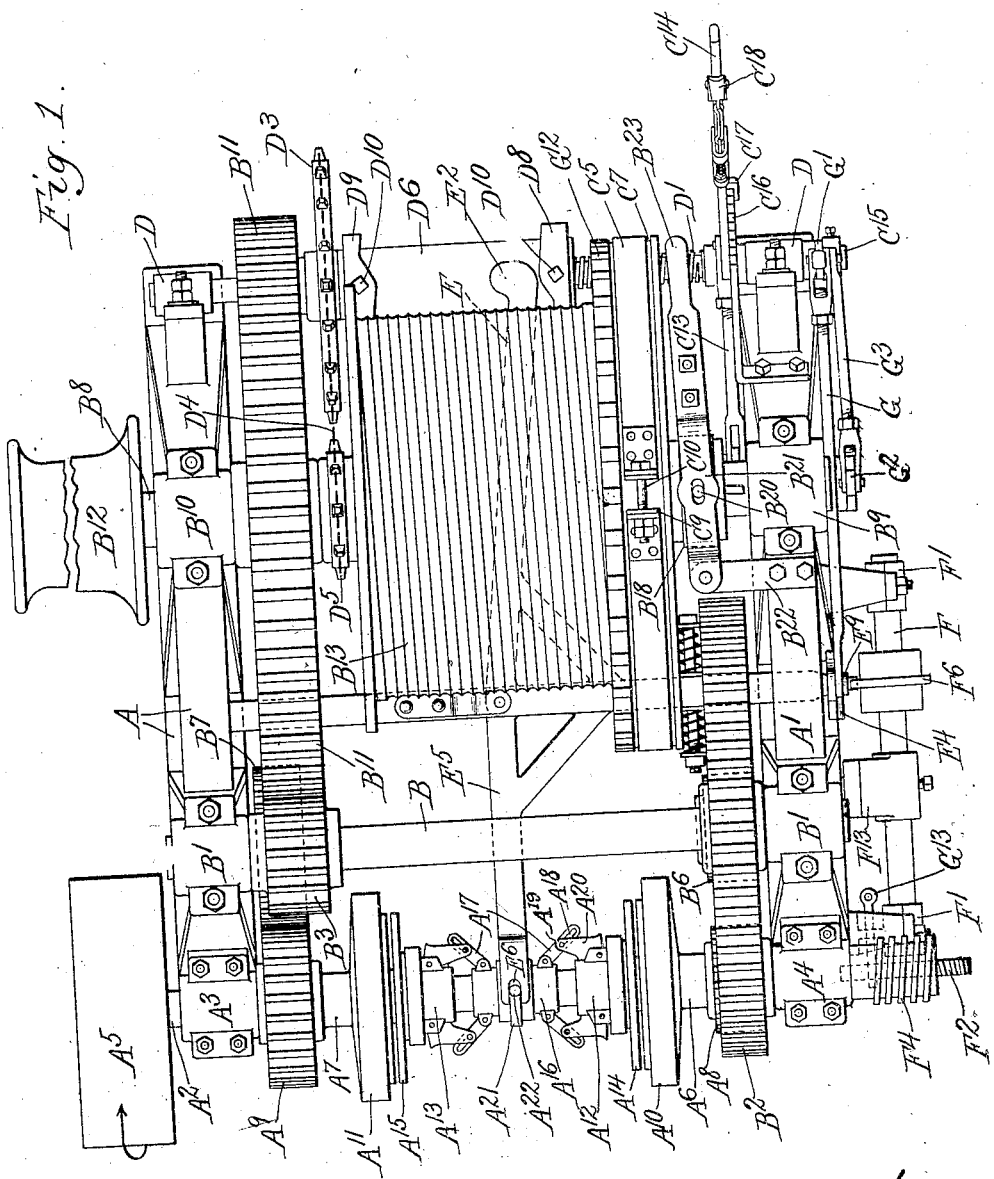

R. A. OGLE.
REVERSING MECHANISM.
APPLICATION FILED FEB. 3, 1913.

1,197,656.

Patented Sept. 12, 1916.
5 SHEETS—SHEET 1.

Witnesses.
Edward T. Wray.
Laurel M. Doremus

Inventor
Robert A. Ogle.
by Parker & Carter
Attorneys.

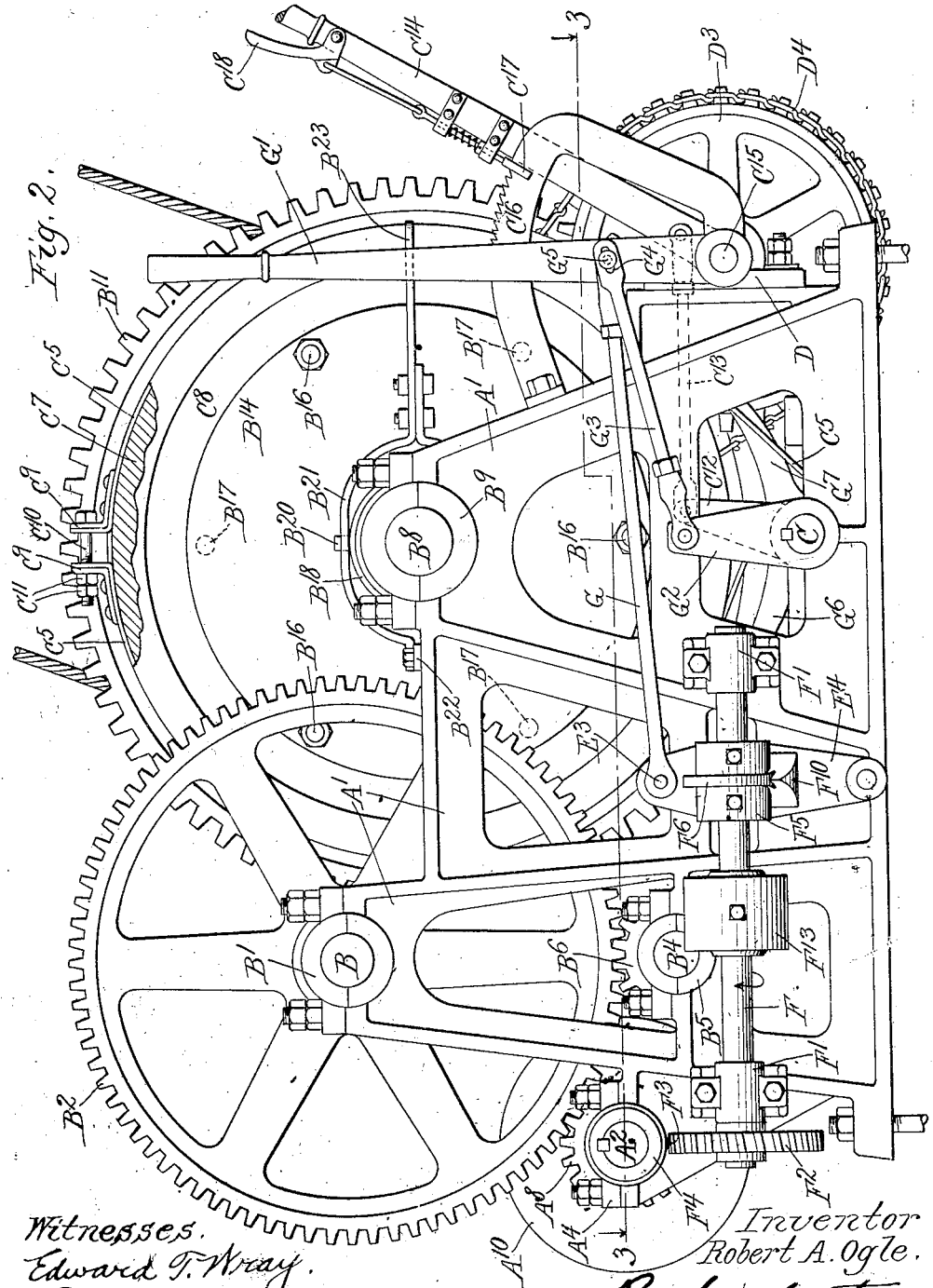

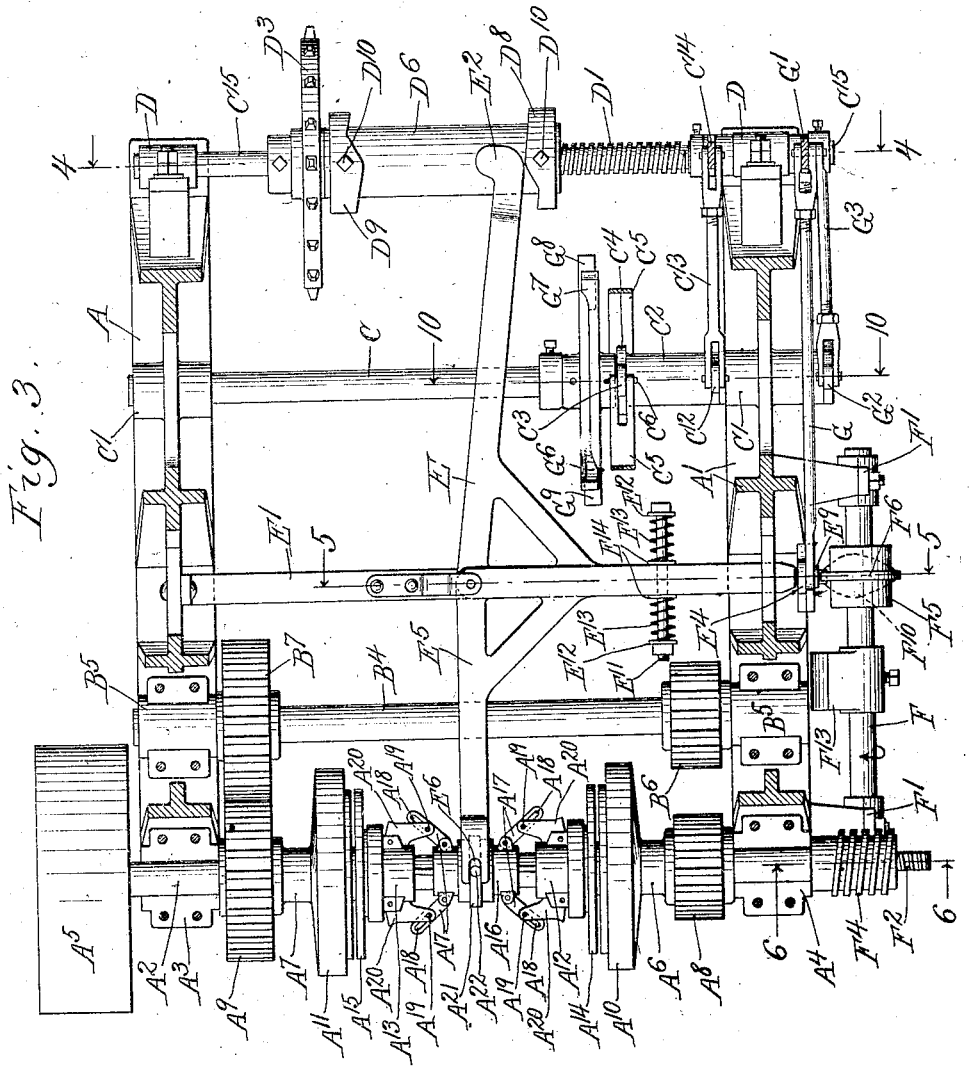

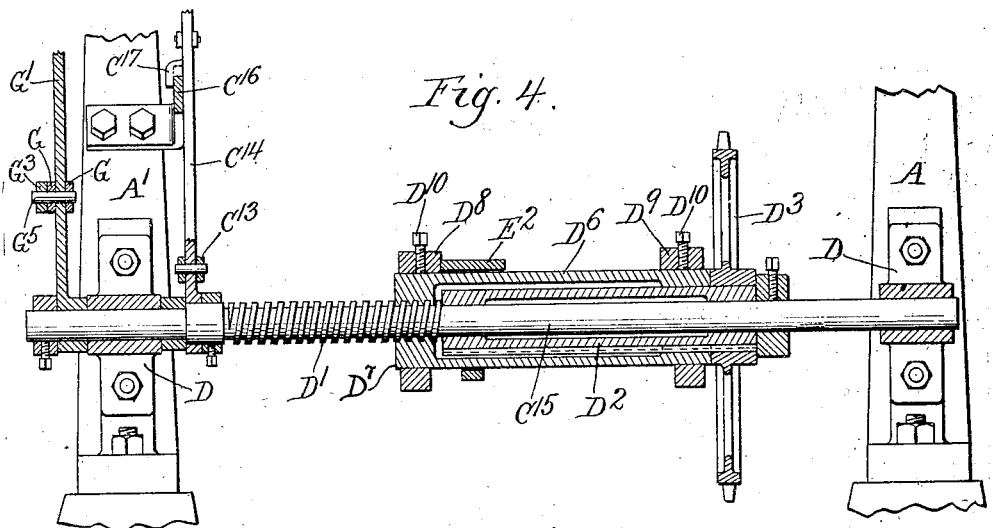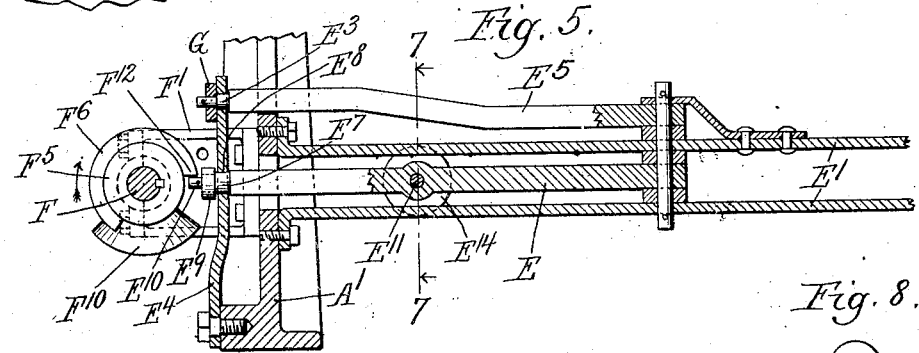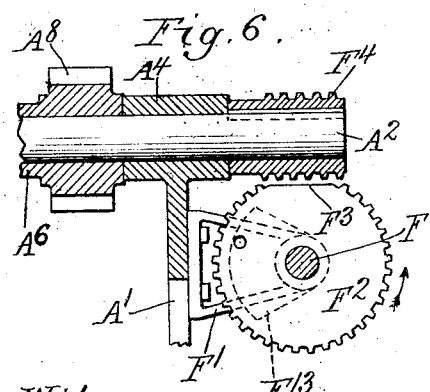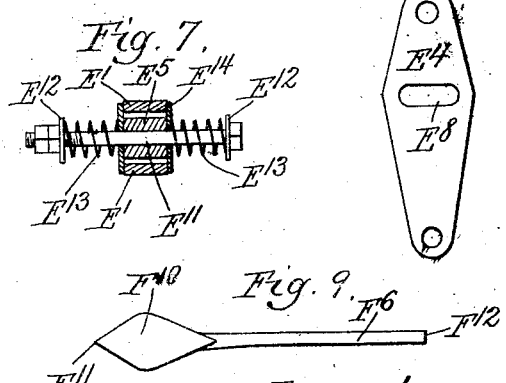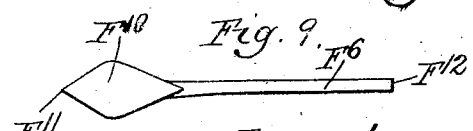

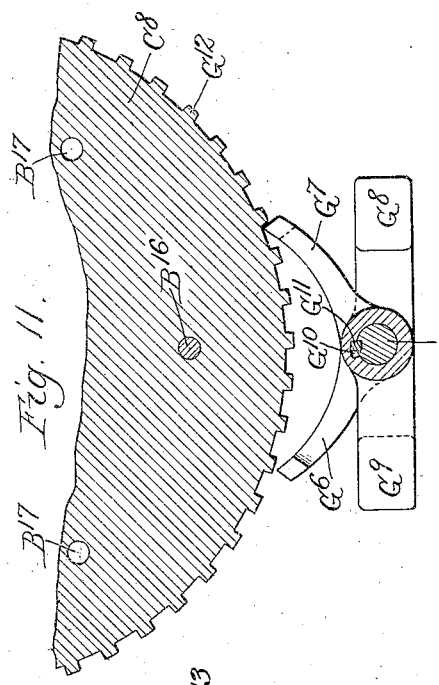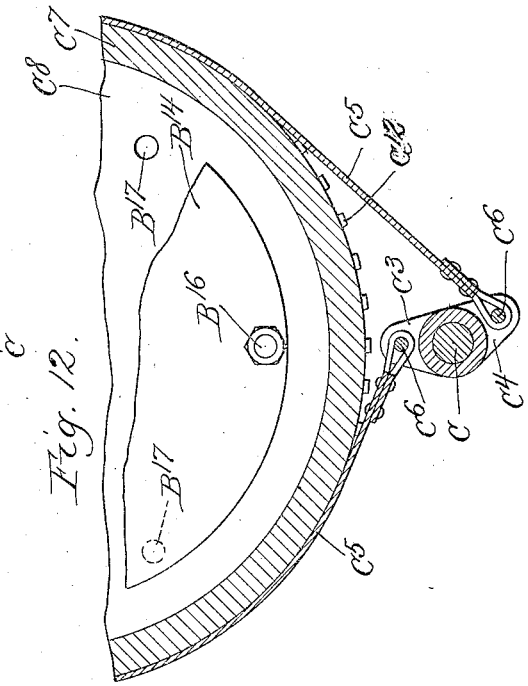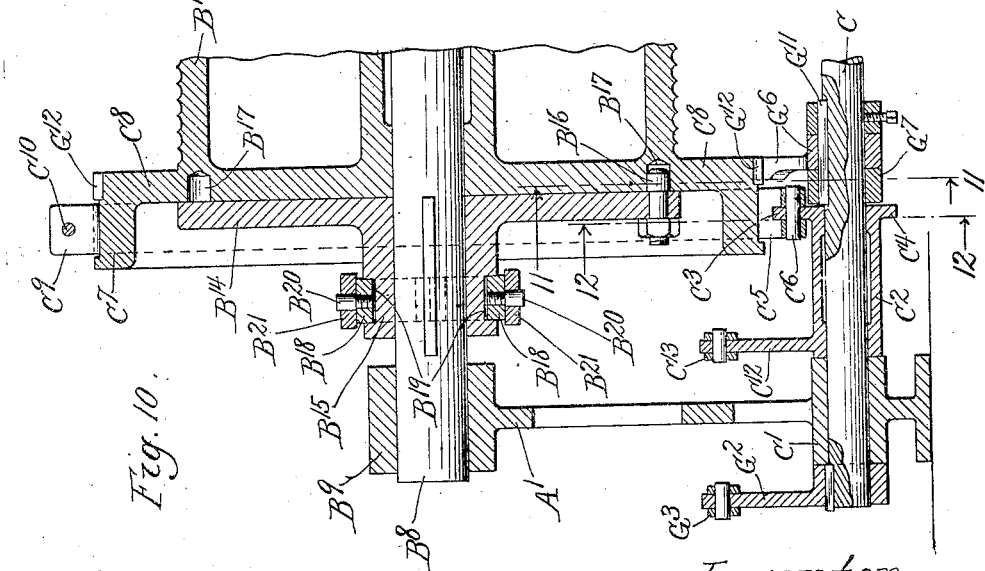

UNITED STATES PATENT OFFICE.

ROBERT A. OGLE, OF CHICAGO, ILLINOIS, ASSIGNOR TO OGLE CONSTRUCTION CO., OF CHICAGO, ILLINOIS, A CORPORATION OF ILLINOIS.

REVERSING MECHANISM.

1,197,656.  Specification of Letters Patent.  Patented Sept. 12, 1916.

Application filed February 3, 1913. Serial No. 745,766.

*To all whom it may concern:*

Be it known that I, ROBERT A. OGLE, a citizen of the United States, residing at Chicago, in the county of Cook and State of Illinois, have invented a certain new and useful Improvement in Reversing Mechanism, of which the following is a specification.

My invention relates to improvements in reversing mechanism and is illustrated diagrammatically in one form in the accompanying drawings, wherein—

Figure 1 is a plan view; Fig. 2, a side elevation partly in section; Fig. 3, a section along the line 3—3 of Fig. 2; Fig. 4, a section along the line 4—4 of Fig. 3; Fig. 5, a section along the line 5—5 of Fig. 3; Fig. 6, a section along the line 6—6 of Fig. 3; Fig. 7, a section along the line 7—7 of Fig. 5; Fig. 8, a detail side elevation of the reversing lever or sector; Fig. 9, is a development of the cam shown in Fig. 5; Fig. 10, a section along the line 10—10 of Fig. 3; Fig. 11, a detail section along the line 11—11 of Fig. 10; Fig. 12, a detail section along the line 12—12 of Fig. 10.

Like parts are indicated by like letters throughout the several figures.

A $A^1$ are the side frames of the hoist.

$A^2$ is the drive shaft mounted in the bearings $A^3$ $A^4$ in the frames A $A^1$ respectively and carrying the driving pulley $A^5$ driven from any suitable source of power not shown. The sleeves $A^6$ $A^7$ are rotatably mounted on the shaft $A^2$ and carry rigidly mounted thereon the pinions $A^8$ $A^9$ and the clutch disks $A^{10}$ $A^{11}$. The sleeves $A^{12}$ $A^{13}$ are splined on the shaft $A^2$ and free to slide therealong and are provided respectively with the clutch disks $A^{14}$ $A^{15}$ in opposition to the clutch disks $A^{10}$ $A^{11}$. The controlling sleeve $A^{16}$ is splined on the shaft $A^2$ and has pivoted thereon the links $A^{17}$ slotted at $A^{18}$ and in slidable connection with the pins $A^{19}$ in the arms $A^{20}$ on the sleeves $A^{12}$ $A^{13}$. The ring $A^{21}$ provided with the pin $A^{22}$ is in rotatable engagement with the sleeve $A^{16}$ but held against longitudinal movement with respect thereto.

The countershaft B is rotatably mounted in the bearings $B^1$ on the side frames A $A^1$ and carries at one end the gear $B^2$ keyed thereon and in mesh with the pinion $A^8$ and at the other end the pinion $B^3$ keyed thereon. The countershaft $B^4$ is mounted in the bearings $B^5$ on the frames A $A^1$ beneath the countershaft B and has at one end the pinion $B^6$ in mesh with the gear $B^2$ and at the other end the pinion $B^7$ in mesh with the pinion $A^9$. The drum shaft $B^8$ is rotatably mounted in the bearings $B^9$ $B^{10}$ on the frames A $A^1$ and carries the gear $B^{11}$ in mesh with the pinion $B^3$. One end of the shaft $B^8$ projects out beyond the bearing $B^{10}$ and carries the winch head $B^{12}$. The drum $B^{13}$ is rotatably mounted on the drum shaft $B^8$. The clutch disk $B^{14}$ is mounted on a hub $B^{15}$, splined on the shaft $B^8$ and is provided with the pins $B^{16}$ engaging the holes $B^{17}$ in the end of the drum. The curved jaw members $B^{18}$ are rotatably engaged in the slot $B^{19}$ on the hub $B^{15}$ and have projecting therefrom the pins $B^{20}$ which are in slidable and rotatable engagement with the yoke $B^{21}$ which is pivotally mounted at one end on the bracket $B^{22}$ and is provided with the operating handle $B^{23}$ whereby the clutch may be moved in or out as the case may be.

The shaft C is rotatably mounted in the bearings $C^1$ on the frames A $A^1$ and has rotatably mounted thereon the sleeve $C^2$ from which project the fingers $C^3$ $C^4$. Pins $C^6$ projecting outwardly from the fingers $C^3$ $C^4$ carry rotatably mounted thereon the free ends of a brake band $C^5$ which surrounds the brake wheel $C^7$ which wheel in turn projects outwardly from the flange $C^8$ on the end of the drum. The angles $C^9$ on the free ends of the brake band are joined by the bolts $C^{10}$ and can be drawn together by means of the nuts $C^{11}$ to adjust the tension in the brake band. The lever $C^{12}$ projects upwardly from one end of the sleeve $C^2$ and is joined by means of the link $C^{13}$ with the brake-lever $C^{14}$ pivoted on the shaft $C^{15}$. The toothed segment $C^{16}$ is located at one side of the lever $C^{14}$ and adapted to be engaged by the ratchet $C^{17}$ controlled by the hand piece $C^{18}$ to lock the brake in the holding position at the will of the operator.

The shaft $C^{15}$ is held against rotation in the brackets D, on the side frames A $A^1$ and is screw-threaded as indicated at $D^1$. The sleeve $D^2$ is rotatable on the shaft $C^{15}$ being held against longitudinal movement therealong and carries the sprocket $D^3$ connected by means of the sprocket chain $D^4$ with the sprocket $D^5$ on the shaft $B^8$. The sleeve $D^6$ is splined on the sleeve $D^2$ and free to slide therealong and carries at one end the nut $D^7$ in screw-threaded engagement with the screw $D^1$. The cylindrical cams $D^8$ $D^9$ are held in position on the opposed ends of the sleeve $D^5$ by the set-screws $D^{10}$.

The bell crank lever E is pivotally mounted on the cross piece $E^1$ joined to the frames A $A^1$ and has at one end the cam contacting head $E^2$ projecting into the path of the cams $D^8$ $D^9$ and at the other end projects out through the side frame $A^1$ terminating in a cylindrical portion $E^3$ which passes through the slot $E^8$ in the reversing lever $E^4$ which lever is pivotally mounted at its lower end on the frame $A^1$. The bell crank lever $E^5$ is pivotally mounted on an axis in line with the pivotal point of the bell crank lever E and is slotted at one end as at $E^6$ to engage the pin $A^{22}$ on the clutch-controlling sleeve $A^{16}$ and is provided at the other end with the cylindrical portion $E^3$ in engagement with the upper end of the lever $E^4$. The bell crank lever E has an extension projecting beyond the lever $E^4$ which carries a cam contacting pin $E^{10}$ and a cam contacting roller $E^9$. The bolt $E^{11}$ passes through the bell crank E at a point intermediate its pivotal point and the cylindrical part $E^7$ and carries the washers $E^{12}$ at either end thereof. The springs $E^{13}$ are interposed between the washers $E^{12}$ and washers $E^{14}$ which rest against the members $E^1$ and tend yieldingly to hold the lever E in the central position.

The shaft F is mounted in the bearings $F^1$ on the frame $A^1$, carries the worm gear $F^2$ mutilated at $F^3$ in opposition to the worm $F^4$ on the shaft $A^2$ and is adapted to rotate as indicated by the arrow. The cylinder $F^5$ is rigidly mounted on the shaft F and carries wound about its surface the cam shape $F^6$ as developed in Fig. 9 and shown in side elevation in Fig. 5. It will be noted that this cam shape is expanded at $F^{10}$ and terminates in a point $F^{11}$ at one end and in a square shoulder $F^{12}$ at the other. The shoulder $F^{12}$ is adapted to engage the part $E^{10}$ on the bell crank lever $E^5$. The weighted lever $F^{13}$ is mounted on the shaft F in such position as to cause that shaft to rotate when the part $E^{10}$ is withdrawn from beneath the part $F^{12}$ so as to bring the mutilated portion of the worm gear out of register with the worm and permit the worm to actuate the worm gear.

Referring now to the manually operated feature of my invention in distinction to the automatic operation which has been previously described, the link G is pivotally connected at one end to the lever $E^5$ where it passes through the lever $E^4$ and at the other end to the lever $G^1$ which lever is rotatably mounted on the shaft $C^{15}$ and by manipulating this lever the operator can substitute his control for the control effected through the bell crank lever E. In order to hold the drum or prevent it from running away when the operator shifts the direction of movement of the shaft C, rotatably mounted as above stated in the bearings $C^1$, it is provided with the lever $G^2$ keyed thereon and connected by means of the link $G^3$ to the lever $G^1$ being slotted at $G^4$ to permit the pin $G^5$ in the lever $G^1$ a certain amount of free play. The dogs $G^6$ $G^7$ provided with the weights $G^8$ $G^9$ are rotatably mounted on the shaft C but provided with the enlarged key ways $G^{10}$ in which is located the key $G^{11}$ this key being located in the shaft C so that when the shaft C is rotated it first rotates a short distance, swinging the key across through the enlarged key way and then carries the dog with it. These dogs $G^6$ $G^7$ engage the teeth $G^{12}$ in the outer peripery of the rim $C^8$ and are so balanced by the weights that each dog normally drops into engagement with the teeth on the flange unless held out by the operation and movement of the shaft.

In order to hold the automatic operative mechanism out of operation and to prevent the movement of the mutilated worm gear when that would be undesirable, not to say, disastrous, a pin $G^{13}$ is provided which passes through the bearing $F^1$ into engagement with the worm gear $F^2$ thus locking the gear in position with the mutilated part in opposition to the worm and holding the gear against that rotation which the weighted lever would normally tend to give it.

It will be evident that, while I have shown in my drawings an operative device, still many changes might be made in size, shape and arrangement of parts without departing materially from the spirit of my invention, and I wish, therefore, that my drawings be regarded in a sense as diagrammatic.

The use and operation of my invention is as follows:—With the parts in the position shown in Fig. 3, for instance, power may be applied to the driving pulley and the driving shaft will be rotated but it will be noted that, since the clutches are both in the disengaged position, the drum will not move. The operator to start the machine will manipulate the hand lever pulling it, in the present instance, toward him. This will disengage the cam and permit the cam shaft to rotate owing to the weight of the weighted lever. This will bring the mutilated worm gear into mesh with the worm which is of course mounted on the drive shaft and constantly rotating. The cam shaft will then rotate carrying with it the cam and the roller $E^9$ will be forced to one side by the cam part $F^{10}$ thus swinging the bell crank lever to throw the clutch disk $A^{14}$ into engagement with the clutch disk $A^{19}$. This will cause the drum to be rotated through the pinion $A^8$, the gear $B^2$ and the pinion $B^3$ in mesh with the gear $B^{11}$. Assuming then that the drive pulley is rotated in the direction shown by the arrow, the drum shaft will be rotated in a clockwise direction as looked at in Fig. 2 and after the drum clutch is in engagement the drum will rotate with the shaft, thus drawing in one end of the cable and paying out the other. This rotation, however, of the drum shaft and drum will cause the sleeve $D^2$ to be rotated and, since the sleeve $D^6$, which carries the nut $D^7$, rotates with it and since the screw $D^1$ is fixed, the sleeve $D^6$ will be caused to move laterally, bringing the cam $D^9$ eventually into engagement with the head $E^2$. Meanwhile, however, as soon as the cam shaft has made a complete revolution the springs $E^{13}$ will have forced the lever E into central position and allowed the shoulder on the end of the cam to rest against the part $E^{10}$ thus holding the cam shaft against further rotation which can be done since by this time the mutilated part of the worm gear will have come into opposition to the worm. The contact of the cam $D^9$ against the head $E^2$ will throw the lever E to the left as viewed in Fig. 3 and permit the drum shaft again to come into operation causing the roller $E^9$ to come on the left side of the cam part $F^{10}$ thus swinging the lever $E^5$ to disengage the clutch members $A^{10}$ $A^{14}$ and engage the clutch members $A^{11}$ $A^{15}$, thus reversing the direction of rotation of the drum and drum shaft which now is driven in a counterclockwise direction through the pinions $A^9$ and $B^7$, pinion $B^6$, gear $B^2$ the pinion $B^3$ and the gear $B^{11}$. This will continue until the sleeve $D^6$ has been fed back to the position shown in Fig. 4 when the direction of movement will again be reversed. This cycle of operation, of course, continues indefinitely the drum working in first one direction and then in the other as long as the power is left on. It will be noted that the cams $D^8$ $D^9$ are adjustable on the sleeve $D^6$ so that they can be moved along it to any desired length of feed in either direction it being necessary only to give time enough for one complete revolution of the cam shaft between each stroke.

It will be noted that the reversing lever $E^4$ is pivoted on the frame and that the function of the lever E is to start the reversing lever and move it to one side sufficiently to permit the cam to start its action. This cam then forces the lever still farther to one side and engages or disengages the clutches as the case may be.

Referring to Fig. 2 it will be noted that there is a link extending from the reversing lever to the manually controlled lever so that when the device is automatically operated this manually controlled lever will be worked back and forth by the movement of the reversing lever just as if the hand of the operator were upon it, and the link $G^3$ connecting the manually operative lever and the shaft C will throw first the dog $C^7$ and then the dog $C^6$ into or out of engagement with the drum to hold the drum against rotation at the instant that the two clutches are out of engagement and while the drum is at rest and before the reversing movement has started. The fact that the dogs are loosely keyed on the shaft, of course, enables this operation to take place without locking or binding the drum at any time except when this is desirable. The manually operated brake band is provided in order that the operator may separately control the rotation of the drum if need be. It will be understood that by this arrangement the device may be used as a simple hoisting engine by merely locking the worm gear so that it cannot turn and thus permitting the operator to control it entirely by means of the hand lever or the pin may be pulled out, the worm gear allowed to rotate and then the device becomes purely an automatic operating device dragging the cable first one way and then another.

The winch head is of course of the usual form, being mounted on the drum shaft. The drum of course can be locked in position independent of the drum shaft and the drum shaft allowed to rotate operating the winch without reference to the drum. This is by means of the clutch arrangement shown in Fig. 10 whose operation is so obvious that no further discussion of it is here needed.

The lever E is adapted to be rocked by the cam $D^8$ or $D^9$. These cams each of them have a throw of approximately one inch so that the movement of the lever at the cam engaging end is about one inch. This movement of the lever E is sufficient to disengage the clutch shifting cam, the end of the lever being permitted to move in the slot in the reversing lever. As soon as this movement of the lever E has taken place, the clutch controlling shaft drops down under the weight of the lever sufficiently to bring the worm wheel into engagement with the worm gear on the driving shaft and from that time on the clutch shifting shaft is positively driven until the cam on that shaft has thrown the clutch lever in the appropriate direction, and this movement of the lever $E^5$ caused by the rocking of the reverse lever $E^4$ which in turn is caused by the pressure of the positively driven cam against the roller on the end of the lever E is sufficient to move the clutch controlling collar $A^{16}$ to control one clutch or the other as the case may be. The object of the springs $E^{13}$ is of course to center the lever E so as to return it to that position at which the movement of the positive driving cam will be stopped with the mutilated parts of the worm wheel opposite the worm, so that that part of the mechanism will not be positively driven until the appropriate time.

It will be understood that the nut driven from the driven shaft or drum acts as a timing device, and since the cams carried by the nut can be moved, the time may be changed, but for any one setting it will be evident that the mechanism will move forward when once started until the timing device has completed its cycle of operation when a reverse will take place and vice versa.

It will be understood that there is a sliding connection between the lever E and the lever E⁴, so that, if need be, as the machine operates, either one of these levers may operate independently one with the other within certain limits.

I claim:

1. A reversing mechanism comprising a driving shaft, clutches thereon, a driven member and connections, one for forward, the other for reverse movement between it and the clutches, means driven by the driving shaft for operating the clutches and means driven by the driven member for throwing the clutch operating means into operation.

2. A reversing mechanism comprising a driving shaft, clutches thereon, a driven member and connections, one for forward, the other for reverse movement between it and the clutches, means driven by the driving shaft for operating the clutches and means driven by the driven member for throwing the clutch operating means into operation, and means for automatically disconnecting the clutch operating means from the driving shaft after each operation of the clutch.

3. A reversing mechanism comprising a driving shaft, clutches thereon, a driven member and connections, one for forward, the other for reverse movement between it and the clutches, means driven by the driving shaft for operating the clutches and automatic means for disconnecting the clutch operating means and the driving shaft when one of the clutches has been operated, and means driven by the driven member for connecting the clutch operating means and the driving shaft.

4. A reversing mechanism comprising a driving shaft, clutches thereon, a driven member and connections, one for forward and the other for reverse movement between it and the clutches, means driven by the driving shaft for operating the clutches, and means for automatically disconnecting such driving means and holding them in the disconnected position at the end of complete operation of the clutch operating means, and means driven by the driven member for again throwing the clutch operating means into operation.

5. A reversing mechanism comprising a driving shaft, a driven member and clutch member and clutch controlled connections between them, one for forward, the other for reverse movement, automatic means for manipulating said clutches, responsive in part to the movement of the driving member and in part to the movement of the driven member for first disengaging one clutch, and then engaging the other clutch.

6. A reversing mechanism comprising a driving shaft, clutches mounted thereon, a driven shaft, a connection between it and each such clutch, one for forward, the other for reverse movement, positive clutch operating means comprising a lever engaging the clutch at one end, a cam engaging the other end of the lever, a worm mounted on the driving shaft, a mutilated worm wheel in mesh with said worm, a shaft connecting said wheel and the cam and means for automatically holding the mutilated worm wheel with the mutilated part opposite the worm.

7. A reversing mechanism comprising a driving shaft, clutches mounted thereon, a driven shaft, a connection between it and each such clutch, one for forward, the other for reverse movement, positive clutch operating means comprising a lever engaging the clutch at one end, a cam engaging the other end of the lever, a worm mounted on the driving shaft, a mutilated worm wheel in mesh with said worm, a shaft connecting said wheel and the cam and means for automatically holding the mutilated worm wheel with the mutilated part opposite the worm, means responsive to the rotation of the driven shaft for disengaging such automatic holding means, a weighted lever on the cam shaft adapted to draw the worm wheel around in mesh with the worm, whereby the cam is rotated to engage the clutch.

8. A reversing mechanism comprising a driving shaft, clutches mounted thereon, a driven shaft, and connections, one for forward the other for reverse drives between it and the clutches, a reversing lever, a clutch operating lever having one end in engagement with it and connected at the other end to both clutches, a power driven clutch shifting mechanism comprising a cam adjacent the reversing lever, a cam shaft and a mutilated worm wheel on the shaft, a worm on the drive shaft in mesh with the worm wheel, and means for controlling the operation of such cam to manipulate the clutches.

9. A reversing mechanism comprising a driving shaft, clutches mounted thereon, a driven shaft, and connections, one for forward the other for reverse drives between it and the clutches, a reversing lever, a clutch operating lever having one end in engagement with it and connected at the other end to both clutches, a power driven clutch shifting mechanism comprising a cam adjacent the reversing lever, a cam shaft and a mutilated worm wheel on the shaft, a worm on the drive shaft in mesh with the worm wheel, a timing lever having one end extending through the reversing lever into the path of the cam, the reversing lever being slotted to permit some movement of the timing lever with respect to it, and means for operating the timing lever to cause the cam to be driven by the worm.

10. A reversing mechanism comprising a driving shaft, clutches mounted thereon, a driven shaft, and connections, one for forward the other for reverse drives between it and the clutches, a reversing lever, a clutch operating lever having one end in engagement with it and connected at the other end to both clutches, a power driven clutch shifting mechanism comprising a cam adjacent the reversing lever, a cam shaft and a mutilated worm wheel on the shaft, a worm on the drive shaft in mesh with the worm wheel, a timing lever having one end extending through the reversing lever into the path of the cam, the reversing lever being slotted to permit some movement of the timing lever with respect to it, a timing gear driven by the driven shaft adapted to release the cam and permit its driving by the worm.

11. A reversing mechanism comprising a driving shaft, clutches mounted thereon, a driven shaft, and connections, one for forward the other for reverse drives between it and the clutches, a reversing lever, a clutch operating lever having one end in engagement with it and connected at the other end to both clutches, a power driven clutch shifting mechanism comprising a cam adjacent the reversing lever, a cam shaft and a mutilated worm wheel on the shaft, a worm on the drive shaft in mesh with the worm wheel, a timing lever having one end extending through the reversing lever into the path of the cam, the reversing lever being slotted to permit some movement of the timing lever with respect to it, and means for operating the timing lever to cause the cam to be driven by the worm, the cam being discontinuous and having a squared end adapted to rest upon the end of the timing lever to hold the cam against rotation.

12. A reversing mechanism comprising a driving shaft, clutches mounted thereon, a driven shaft, and connections, one for forward the other for reverse drives between it and the clutches, a reversing lever, a clutch operating lever having one end in engagement with it and connected at the other end to both clutches, a power driven clutch shifting mechanism comprising a cam adjacent the reversing lever, a cam shaft and a mutilated worm wheel on the shaft, a worm on the drive shaft in mesh with the worm wheel, a timing lever having one end extending through the reversing lever into the path of the cam, the reversing lever being slotted to permit some movement of the timing lever with respect to it, a timing gear driven by the driven shaft adapted to release the cam and permit its driving by the worm, the cam being discontinuous and having a squared end adapted to rest upon the end of the timing lever to hold the cam against rotation.

In testimony whereof, I affix my signature in the presence of two witnesses this 31st day of January, 1913.

ROBERT A. OGLE.

Witnesses:
GENEVA HERTH,
LAUREL M. DOREMUS.